United States Patent [19]

Kuhn

[11] Patent Number: 4,567,582

[45] Date of Patent: Jan. 28, 1986

[54] DIRECT DETERMINATION OF STACKING VELOCITIES IN THREE DIMENSIONAL SEISMIC PROSPECTING

[75] Inventor: Milos J. Kuhn, Bartlesville, Okla.

[73] Assignee: Phillips Petroleum Company, Bartlesville, Okla.

[21] Appl. No.: 395,207

[22] Filed: Jul. 6, 1982

[51] Int. Cl.[4] .................................................. G01V 1/36
[52] U.S. Cl. .................................... 367/56; 364/421; 367/59; 367/63
[58] Field of Search ....................... 367/63, 59, 56, 38; 364/421

[56] References Cited

U.S. PATENT DOCUMENTS

| | | | |
|---|---|---|---|
| 3,529,282 | 9/1970 | Brown et al. | 367/56 |
| 3,793,620 | 2/1974 | Miller | 367/63 |
| 3,867,713 | 2/1975 | Tegland et al. | 367/63 |
| 3,906,433 | 9/1975 | Davis | 367/61 |
| 4,001,770 | 1/1977 | Hofer | 367/56 |
| 4,048,612 | 9/1977 | Lawyer | 367/56 |
| 4,241,429 | 12/1980 | Bloomquist et al. | 367/63 |

OTHER PUBLICATIONS

Taner et al., "Velocity Spectra–Digital Computers Derivation and Applications of Velocity Functions," 12/69, *Geophysics*, vol. 34, #6, pp. 859–887.
Hubral, "Interval Velocities from Surface Measurements in the Three Dimensional Plane Layer Case," 4/76, *Geophysics*, vol. 41, #2, pp. 233–242.

*Primary Examiner*—Nelson Moskowitz
*Assistant Examiner*—Ian J. Lobo
*Attorney, Agent, or Firm*—William R. Sharp

[57] ABSTRACT

The stacking velocity required for common midpoint stacking in three-dimensional seismic exploration is determined by determining the stacking velocity in three directions for a common midpoint. The magnitude of the thus determined stacking velocities in any three directions defines an ellipse centered at the common midpoint. The equation of the thus defined ellipse determines the stacking velocity in any direction about the common midpoint.

7 Claims, 5 Drawing Figures

DIRECT DETERMINATION OF STACKING VELOCITIES IN THREE DIMENSIONAL SEISMIC PROSPECTING

This invention relates to three-dimensional seismic prospecting. In one aspect this invention relates to method and apparatus for determining the stacking velocities required for common midpoint stacking in three-dimensional seismic exploration.

The seismic method of mapping geological subsurfaces of the earth involves the use of a source of seismic energy and its reception by an array of seismic detectors, generally referred to as geophones. When used on land, the source of seismic energy generally is a high explosive charge electrically detonated in a bore hole located at a selected grid point in a terrain or is an energy source capable of delivering a series of impacts to the earth's surface such as that used in Vibroseis. The acoustic waves generated in the earth by the explosion or impacts are transmitted back from strata boundaries and reach the surface of the earth at varying intervals of time, depending on the distance and the nature of the subsurface traversed. These returning acoustic waves are detected by the geophones, which function to transduce such acoustic waves into representative electrical signals. The plurality of geophones are arrayed in a selected manner to detect most effectively the returning acoustic waves and generate electrical signal representive thereof from which data may be deduced concerning the geological subsurface of the earth.

The outputs from the seismic detectors are commonly summed to produce a composite trace for enhancing the subsurface structure information represented by features of such signals. The purpose of such summing is to give prominence to the important features in the seismic signal and to reduce or remove those features which obscure the important parts of the signal. Both direct and weighted summations of seismic detector array outputs have been used. Of particular importance in signal to noise enhancement are stacking techniques generally known in the art as common midpoint or common depth point stacking.

It is known that common midpoint stacking requires knowledge of what is referred to as the "stacking velocity". The stacking velocity is calculated from normal move out measurements and is used to maximize events in common midpoint stacking. In two-dimensional seismic exploration, the stacking velocity may be calculated directly as will be described more fully hereinafter. In two dimensions there will be one stacking velocity for one common midpoint. In three-dimensional seismic prospecting, it has in the past been difficult to determine the stacking velocities required for common midpoint stacking because there are a plurality of stacking velocities for each common midpoint. It is thus an object of this invention to provide method and apparatus for determining the stacking velocities required for common midpoint stacking in three-dimensional seismic exploration.

In accordance with the present invention, method and apparatus is provided for determining the stacking velocity in three directions for a common midpoint in three-dimensional seismic prospecting. It has been found that knowledge of the stacking velocity in any three directions with respect to a common midpoint provides a means by which the stacking velocity in any direction may be determined. Thus, the stacking velocities in the directions required for common midpoint stacking are determined based on the determination of the stacking velocities in any three directions to provide a technique by which common midpoint stacking may be utilized in three-dimensional prospecting.

In general, the determination of the stacking velocity in three directions for a common midpoint in three-dimensional prospecting may be accomplished by setting up three lines of seismic source locations and seismic receivers where such three lines intersect at the common mid-point. Normal movement measurements for each line is utilized to determine the stacking velocity for each line. The three stacking velocities thus determined define an ellipse which is centered at the common midpoint. It has been found that the ellipse defines the stacking velocity in any direction with respect to the common midpoint and thus a means is provided by which the stacking velocities required for common midpoint stacking in three-dimensional seismic prospecting may be determined.

Other objects and advantages of the invention will be apparent from the foregoing brief description of the invention and the claims as well as the detailed description of the drawings in which:

Figure 1:
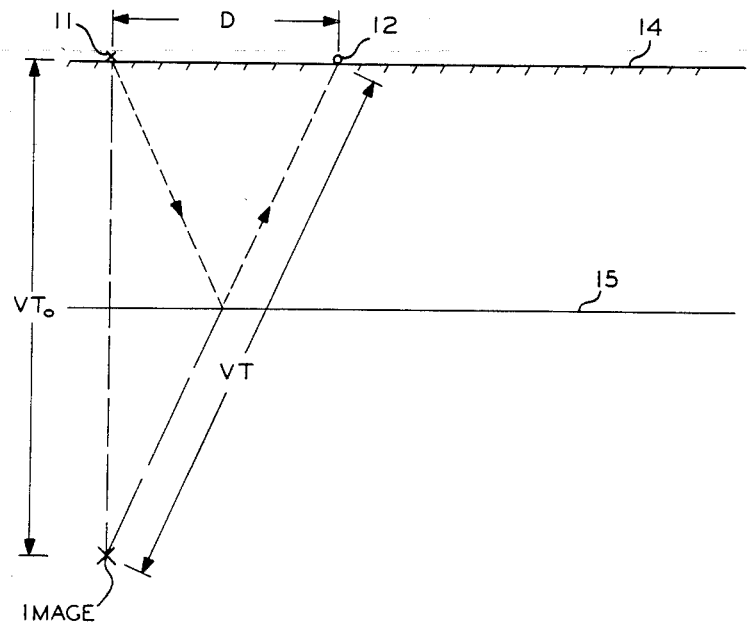
FIG. 1 is an illustration of the propagation of an acoustic signal from a seismic source to a seismic receiver.

Referring now to FIG. 1 there is illustrated a seismic source 11 and a seismic receiver 12 located on the surface of the earth 14. For the sake of illustration it will be assumed that a reflecting plane 15 lies substantially parallel to the earth's surface 14. Accoustic waves from the seismic source 11 are reflected from the reflecting plane 15 and are received by the seismic reciever 12. The time T required for the wave front generated by the seismic source 11 to reach the seismic receiver 12 can be measured. The time $T_0$ is defined as the time that would be required for the wave front generated by the seismic source 11 to be reflected from the reflecting plane 15 at a point below the seismic source 11 and be received by a receiver located substantially adjacent to seismic source 11.

An image point may be graphically located at a point equidistant from the reflecting plane 15 with respect to the seismic source 11. The distance between the seismic source 11 and the image point is defined as $VT_0$ where V is the velocity of the wavefront through the strata. The distance between the image point and the receiver 12 may be defined as VT. The distance between the seismic source 11 and the seismic receiver 12 is defined as D. Using trigonometric relations gives $$V^2T^2 = V^2T_0^2 + D^2 \tag{1}$$

Rearranging equation 1 gives $$V^2T^2 - V^2T_0^2 = D^2 \tag{2}$$

which is the equation of a hyperbola. For a plurality of transmitters and receivers, T will vary and D will vary but the stacking velocity for the common midpoint with respect to the reflecting plane 15 will still be given by a hyperbolic curve having the form of equation (2) as will be more fully discussed hereinafter.

Figure 2:
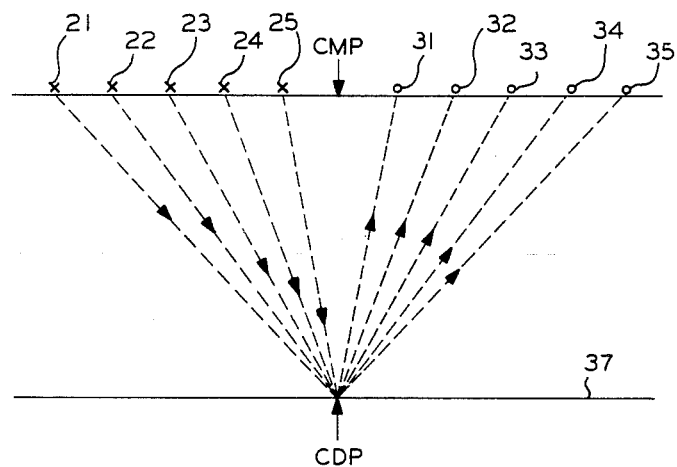
FIG. 2 is an illustration of a typical two-dimensional seismic exploration system.
Figure 3:
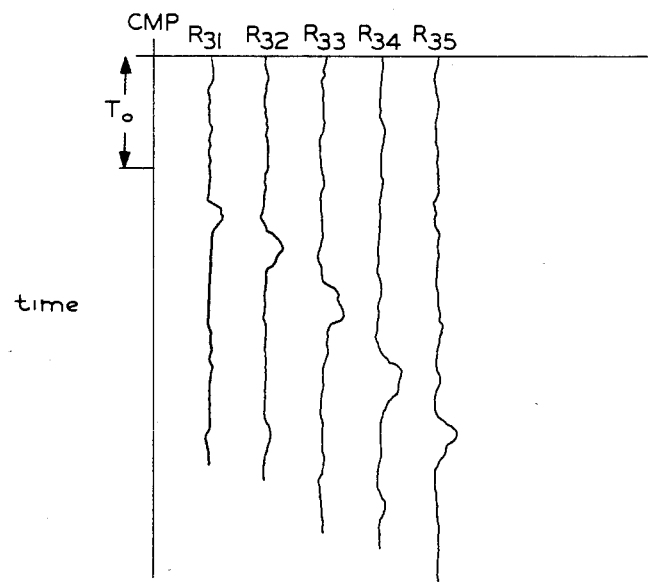
FIG. 3 is an illustration of the signals which might be received from the two-dimensional seismic exploration system illustrated in FIG. 2.

Referring now to FIG. 2, there is illustrated a plurality of seismic sources 21–25 and a plurality of seismic receivers 31–35 arranged around a common midpoint. For the sake of illustration, the seismic sources are equidistantly spaced and the seismic receivers are equidistantly spaced but this is not required and typically would not occur in seismic prospecting because of obstructions and other factors. However, each source receiver pair should be equally spaced from the common midpoint to the extent possible. Again, assuming a reflecting plane 37 which is substantially parallel to the surface on which the sources and receivers are located, acoustic waves from each of the seismic sources is reflected from the common depth point and received by a respective one of the seismic receivers as is illustrated. The output from the seismic receivers 31–35 might be as illustrated in FIG. 3. The time $T_0$ would be the time required for a wave to propagate from the common midpoint to the common depth point and be reflected back to and received by a receiver at the common midpoint. Using techniques which are described by M. Turhan Taner and Fulton Koehler in an article entitled "Velocity Spectra—Digital Computer Derivation and Applications of Velocity Functions" which was published in Geophysics, Vol. 34, No. 6 (December 1969), a hyperbola may be fitted to the peaks, or signals, illustrated in FIG. 3. The hyperbolic curve represents the stacking velocity for the common midpoint illustrated in FIG. 2. The curve will have the form of equation (2) and may be solved to give the stacking velocity.

Figure 4:
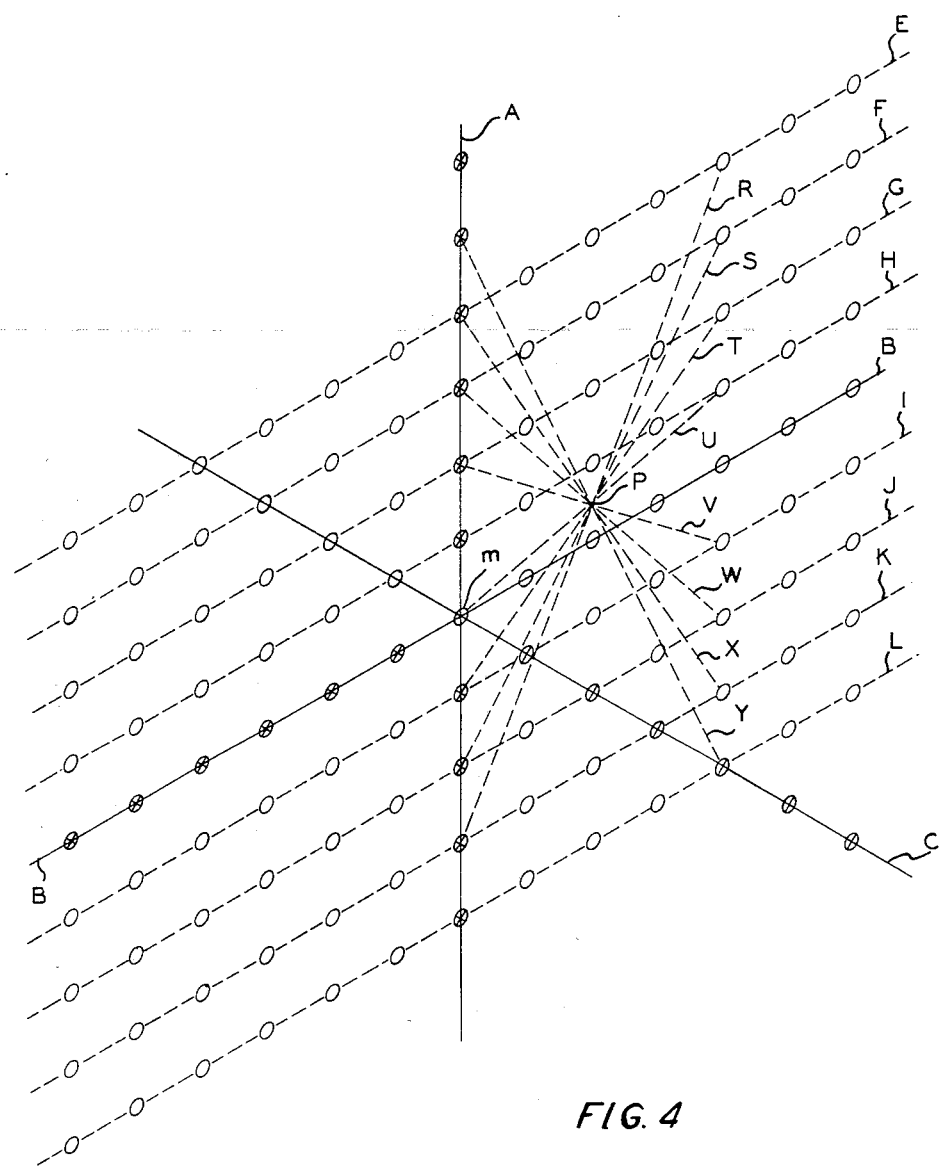
FIG. 4 is an illustration of the preferred configuration of sources and receivers for the three-dimensional seismic prospecting system of the present invention.

Referring now to FIG. 4, there is illustrated a portion of a preferred three-dimensional seismic prospecting array. Circles represent seismic receivers while circles with X's contained therein represent seismic sources and seismic receivers. Many variations are possible in the array illustrated in FIG. 4 as will be more fully described hereinafter.

Line A may have a seismic source at each receiver location. The seismic source could be a mobile source such as a Vibroseis truck or could be an explosive charge if desired. Lines B and C also contain seismic sources. Lines E–L preferably contain only receivers except at the points where lines E–L cross lines A or part of C. Lines E–L are preferably substantially parallel to line B. Lines A, B And C intersect at point M and preferably the angle between any two adjacent portions of lines A, B and C is 60°.

Selecting point M as a common midpoint, the stacking velocities in the direction of lines A, B and C respectively may be determined as has previousluy been described with respect to FIGS. 2 and 3. Essentially, data is obtained for lines A, B and C in the form illustrated in FIG. 3. A hyperbola is determined for lines A, B and C and each hyperbola gives the stacking velocity in the direction of lines A, B and C respectively.

Figure 5:
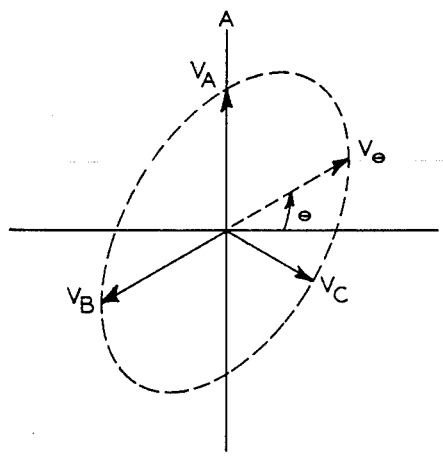
FIG. 5 is a graphical illustration of stacking velocities determined in accordance with the present invention.

Referring now to FIG. 5, hypothetical stacking velocities have been plotted on an axis chosen in such a manner that the direction of the vertical axis is the same as the direction of line A illustrated in FIG. 4. The three points $V_A$, $V_B$ and $V_C$ define an ellipse. (It is well known from plane geometry that any three points define an ellipse). It has been found that the ellipse determined by the three stacking velocities $V_A$, $V_B$ and $V_C$ gives the stacking velocity in any direction about the common midpoint M. Thus, if the stacking velocity for the angle $\theta$ is required, that stacking velocity $V_\theta$ is given by the ellipse determined by the stacking velocities $V_A$, $V_B$ and $V_C$.

Referring back to FIG. 4, it may be assumed that the stacking velocities determined for any direction above point M will not vary considerably for some distance from point M. Thus, a configuration might be chosen such as illustrated in FIG. 4 where point P is chosen as a common midpoint. The stacking velocities for lines R–Y can be determined from the ellipse illustrated in FIG. 5 and thus common midpoint stacking may be utilized for the common midpoint P using the three-dimensional seismic prospecting system illustrated in FIG. 4.

As has been previously stated, the acute angles between adjacent sections of lines A, B and C are preferably 60°. It is noted that any angular configuration of lines A, B and C may be utilized because all that is required in the present invention is the determination of the stacking velocity in any three directions. Such determination provides three points which defines an ellipse. Stacking velocities in any direction with respect to the common midpoint may be derived from the thus determined ellipse. The 60° angles are preferred because they provide optimum accuracy in the determination of the ellipse.

Any suitable number of source-receiver pairs may be utilized. At least two source-receiver pairs are required on each line to establish the stacking velocity. Typically, the number of source-receiver pairs will range from about 6 to about 96. As usual herein, the term "source-receiver pairs" refers to a source and receiver located on opposite sides of a common midpoint and spaced substantially equidistantly from the common midpoint.

Any desired spacing between adjacent sources or receivers may be utilized. In general, the spacing must be such as to satisfy the well known spatial sampling theorem. Spacings in the range of about 25 m to about 50 m will typically be utilized. Also, it is preferred that sources will be present on line A at each receiver location so that a number of common midpoints may be chosen.

The invention has been described in terms of a preferred embodiment as illustrated in FIGS. 4 and 5. As has been previously discussed, a number of variations are possible with respect to the preferred embodiment. The present invention requires that the stacking velocity must be determined in three directions and this might be accomplished by a number of different configurations. Such variations and different configurations are within the scope of the present invention.

That which is claimed is:

1. Apparatus comprising:
   at least first and second seismic receivers located on a first line, wherein said first line originates at a point M;
   at least third and fourth seismic receivers located on a second line, wherein said second line originates at said point M;
   at least fifth and sixth seismic receivers located on a third line, wherein said third line originates at said point M;
   means for generating acoustic waves in the earth at at least first, second, third, fourth, fifth and sixth seismic source locations, wherein said first and second seismic source locations are on a fourth line which is an extension of said first line from said point M, wherein said third and fourth seismic source locations are on a fifth line which is an extension of said second line from said point M, wherein said fifth and sixth seismic source locations are on a sixth line which is an extension of said third line from said point M, wherein said first seismic source location and said first seismic receiver are substantially equidistantly spaced from said point M, wherein said second seismic source location and said second seismic receiver are substantially equidistantly spaced from said point M, wherein said third seismic source location and said third seismic receiver are substantially equidistantly spaced from said point M, wherein said fourth seismic source location and said fourth seismic receiver are substantially equidistantly spaced from said point M, wherein said fifth seismic source location and said fifth seismic receiver are substantially equidistantly spaced from said point M, and wherein said sixth seismic source location and said sixth seismic receiver are substantially equidistantly spaced from said point M;

means for activating said means for generating acoustic waves so as to impart acoustic waves into the earth at said first seismic source location, said second seismic source location, said third seismic source location, said fourth seismic source location, said fifth seismic source location and said sixth seismic source location at desired times, wherein said first seismic receiver provides a first output signal in response to the generation of acoustic waves at said first seismic source location, wherein said second seismic receiver provides a second output signal in response to the generation of acoustic waves at said second seismic source location, wherein said third seismic receiver provides a third output signal in response to the generation of acoustic waves at said third seismic source location, wherein said fourth seismic receiver provides a fourth output signal in response to the generation of acoustic waves at said fourth seismic source location, wherein said fifth seismic receiver provides a fifth output signal in response to the generation of acoustic waves at said fifth seismic source location, and wherein said sixth seismic receiver provides a sixth output signal in response to the generation of acoustic waves at said sixth seismic source location;

means for determining a first stacking velocity in the direction of said first and fourth lines in response to said first and second output signals, for determining a second stacking velocity in the direction of said second and fifth lines in response to said third and fourth output signal, and for determining a third stacking velocity in the direction of said third and sixth lines in response to said fifth and sixth output signals; and means for determining the equation of an ellipse based on the magnitude of said first stacking velocity, the magnitude of said second stacking velocity and the magnitude of said third stacking velocity, wherein the equation of said ellipse determines the stacking velocity in any direction about said point M.

2. Apparatus in accordance with claim 1 wherein the angle between adjacent ones of said first, second, third, fourth, fifth and sixth lines is substantially 60°.

3. Apparatus in accordance with claim 2 wherein the number of seismic receivers located on said first line is in the range of about 6 to about 96, wherein the number of said seismic receivers located on said second line is in the range of about 6 to about 96, wherein the number of seismic receivers located on said third line is in the range of about 6 to about 96, wherein the number of seismic source locations on said fourth line is equal to the number of seismic receivers located on said first line, wherein the number of seismic source locations on said fifth line is equal to the number of seismic receivers located on said second line, and wherein the number of seismic source locations on said sixth line is equal to the number of seismic receivers located on said third line.

4. A method for determining the stacking velocity in any direction around a common midpoint M comprising the steps of:

generating acoustic waves in the earth at a first seismic source location on a first line which originates at said common midpoint M;

establishing a first output signal representative of the output of a first seismic receiver located on a second line which is an extension of said first line from said common midpoint M, wherein said first seismic source location and said first seismic receiver are substantially equidistantly spaced from said common midpoint M;

generating acoustic waves in the earth at a second seismic source location on said first line;

establishing a second output signal representative of the output of a second seismic receiver located on said second line wherein said second seismic source location and said second seismic receiver are substantially equidistantly spaced from said point M;

generating acoustic waves in the earth at a third seismic source location on a third line which originates at said common midpoint M;

establishing a third output signal representative of the output of a third seismic receiver located on a fourth line which is an extension of said third line from said common midpoint M, wherein said third seismic source location and said third seismic receiver are substantially equidistantly spaced from said common midpoint M;

generating acoustic waves in the earth at a fourth seismic source location on said third line;

establishing a fourth output signal representative of the output of a fourth seismic receiver located on said fourth line, wherein said fourth seismic source location and said fourth seismic receiver are substantially equidistantly spaced from said common midpoint M;

generating acoustic waves in the earth at a fifth seismic source location on a fifth line which originates at said common midpoint M;

establishing a fifth output signal representative of the output of a fifth seismic receiver located on a sixth line which is an extension of said fifth line from said common midpoint M, wherein said fifth seismic source location and said fifth seismic receiver are substantially equidistantly spaced from said common midpoint M;

generating acoustic waves in the earth at a sixth seismic source location on said fifth line which originates at said common midpoint M;

establishing a sixth output signal representative of the output of a sixth seismic receiver located on said sixth line, wherein said sixth seismic source location and said sixth seismic receiver are substantially equidistantly spaced from said common midpoint M;

determining a first stacking velocity in the direction of said first and second lines in response to said first and second output signals;

determining a second stacking velocity in the direction of said third and fourth lines in response to said third and fourth output signals;

determining a third stacking velocity in the direction of said fifth and sixth lines in response to said fifth and sixth output signals; and determining the equation of an ellipse based on the magnitude of said first stacking velocity, the magnitude of said second stacking velocity and the magnitude of said third stacking velocity, wherein the equation of said ellipse determines the stacking velocity in any direction about said common midpoint M.

5. A method in accordance with claim 4 wherein the angle between adjacent ones of said first, second, third, fourth, fifth and sixth lines is substantially 60°.

6. An apparatus as recited in claim 1, wherein said means for determining stacking velocities determines each said stacking velocity in response to its corresponding output signals by fitting a curve to the corresponding output signals, the curve having the form of a hyperbolic equation which is solved to give the stacking velocity.

7. A method as recited in claim 4, wherein in each stacking velocity determining step, the stacking velocity is determined in response to its corresponding output signals by fitting a curve to the corresponding output signals, the curve having the form of a hyperbolic equation which is solved to give the stacking velocity.

* * * * *